United States Patent
Brundidge et al.

(10) Patent No.: US 7,661,018 B2
(45) Date of Patent: Feb. 9, 2010

(54) METHOD, APPARATUS AND PROGRAM STORAGE DEVICE FOR PROVIDING AUTOMATIC RECOVERY FROM PREMATURE REBOOT OF A SYSTEM DURING A CONCURRENT UPGRADE

(75) Inventors: Jimmie Lee Brundidge, Durham, NC (US); Chiahong Chen, Oro Valley, AZ (US); Itzhack Goldberg, Hadera, IL (US); Yotam Medini, Israel (IL)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 11/614,080

(22) Filed: Dec. 21, 2006

(65) Prior Publication Data

US 2008/0155333 A1 Jun. 26, 2008

(51) Int. Cl.
*G06F 11/00* (2006.01)
(52) U.S. Cl. .......................................... 714/6; 717/171
(58) Field of Classification Search ................... 717/171
See application file for complete search history.

(56) References Cited

U.S. PATENT DOCUMENTS

| | | | |
|---|---|---|---|
| 5,966,301 A * | 10/1999 | Cook et al. ..................... 700/3 |
| 6,675,258 B1 * | 1/2004 | Bramhall et al. ............. 711/114 |
| 6,678,883 B1 | 1/2004 | Berry et al. | |
| 6,681,389 B1 * | 1/2004 | Engel et al. .................. 717/173 |
| 6,681,390 B2 * | 1/2004 | Fiske .......................... 717/173 |
| 6,836,859 B2 * | 12/2004 | Berg et al. ..................... 714/36 |
| 7,028,177 B2 | 4/2006 | Schultz et al. | |
| 7,032,218 B2 | 4/2006 | Shirasawa et al. | |
| 7,085,957 B2 * | 8/2006 | Sundareson et al. ............. 714/6 |
| 2004/0054995 A1 * | 3/2004 | Lee ............................. 717/173 |
| 2004/0103400 A1 | 5/2004 | Johnsen | |
| 2006/0004779 A1 | 1/2006 | Rossiter et al. | |
| 2006/0020937 A1 | 1/2006 | Schaefer | |

FOREIGN PATENT DOCUMENTS

JP 2004-280653 10/2004

\* cited by examiner

*Primary Examiner*—Christopher S McCarthy
(74) *Attorney, Agent, or Firm*—William Konrad; Konrad Raynes and Victor LLP

(57) ABSTRACT

A method, apparatus and program storage device for providing automatic recovery from premature reboot of a system during a concurrent upgrade is disclosed. A concurrent code-load to a plurality of storage controllers of a storage system is initiated. A code-load failure is detected. The stage of the code-load failure is identified. A code-load recovery process based upon the identification of the stage that the code-load failure occurred is initiated.

34 Claims, 5 Drawing Sheets

METHOD, APPARATUS AND PROGRAM STORAGE DEVICE FOR PROVIDING AUTOMATIC RECOVERY FROM PREMATURE REBOOT OF A SYSTEM DURING A CONCURRENT UPGRADE

CROSS-REFERENCE TO RELATED APPLICATIONS

This application is related to co-pending and commonly-assigned U.S. patent application Ser. No. 11/614,076, filed on Dec. 20, 2006, by Jimmie L. Brundidge, Chiahong Chen, Itzhack Goldberg, and Daniel A. Heffley, entitled "METHOD, APPARATUS AND PROGRAM STORAGE DEVICE FOR PERFORMING FAULT TOLERANT CODE UPGRADE ON A FAULT TOLERANT SYSTEM BY DETERMINING WHEN FUNCTIONAL CODE REACHES A DESIRED STATE BEFORE RESUMING AN UPGRADE", which is incorporated by reference herein:

BACKGROUND OF THE INVENTION

1. Field of the Invention

This invention relates in general to a computer systems, and more particularly to a method, apparatus and program storage device for providing automatic recovery from premature reboot of a system during a concurrent upgrade.

2. Description of Related Art

Storage controllers are used in storage systems to control arrays of hard disk drives including storing data in a distributed manner in multiple disk drives and having redundancy information (such as parity information) as well as data to be stored in the disk drives. To prevent data loss in the event of a disk drive failure, storage controllers may be configured to provide a range of different types of data redundancy including for example RAID 1, RAID 5 and RAID 0+1. Host computer typically do not see devices that correspond directly to the individual disk drives; rather storage controllers create logical devices. If a disk drive fails, the storage controller uses the redundancy information to recover the information stored in the failed disk drive.

In addition, a storage controller may be configured with a plurality of storage clusters, each of which provides for selective connection between a host computer and storage devices and each preferably being on a separate power boundary. Each cluster might include a multipath storage director with first and second storage paths, a cache memory and a non-volatile storage ("NVS") memory.

In many storage products, two or more controllers are used to provide redundancy. This redundancy can prevent interruption of service in the event of a software or hardware failure on one of the controllers. In addition, the redundancy can be leveraged when code (software or firmware) updates are provided. One type of code update process is re called concurrent code-load. Concurrent code-load processes generally require the computer system to be fully operational before a code-load upgrade is begun.

Errors and other unforeseen circumstances can cause the code-load upgrade process to fail in the middle due to a premature reboot of the system. Premature reboot of a system can lead to a degraded system state including where either only one controller is active (either running on the old code or the new code) or where one controller is running with the new code and the other controller is left running on the old code which may also result in unanticipated errors. In the former case, the overall system is exposed to a single point of failure and significant performance degradation.

Recovering from premature reboot failures can be a lengthy and expensive process. Manually restoring a system to a fully operational state so that a code-load upgrade can be retried often requires a trained system administrator with knowledge of the internal code-load actions. In addition, where there are multiple clusters, it is typically difficult to achieve a fully operational state if the premature reboot occurred after an update of only one of the clusters. Because of this, the user may be required to switch back to the original code level to reach a fully operational state. In addition, many users do not have sufficient knowledge of internal code-load actions to fix a code-load failure and must contact field service personnel.

It can be seen that there is a need for an improved method of recovering from premature reboot of a system during a concurrent code-load upgrade.

SUMMARY OF THE INVENTION

To overcome the limitations in the prior art described above, and to overcome other limitations that will become apparent upon reading and understanding the present specification, the present invention discloses a method, apparatus and program storage device for providing automatic recovery from premature reboot of a system during a concurrent upgrade.

The present invention solves the above-described problems by allowing the code upgrade to continue despite the premature reboot of the system. The upgrade may continue without causing any manual intervention to recover. Further, exposure to a single point of failure and performance degradation is significantly minimized and the support costs for concurrent code-load upgrades of storage systems is reduced by minimizing the risks of interruption of service.

A program product in accordance with the principles of the present invention includes a computer readable medium embodying at least one program of instructions executable by a computer to perform operations for providing automatic recovery from premature reboot of a system during a concurrent upgrade. The operations include beginning a concurrent code-load to a plurality of storage controllers of a storage system, detecting a code-load failure, identifying the stage of the code-load failure and initiating a code-load recovery process based upon the identification of the stage that the code-load failure occurred.

In another embodiment of the present invention, a system is provided. The system includes a processor and memory, coupled to the processor, the memory including a computer usable medium embodying at least one program of instructions to perform operations, the operations including beginning a concurrent code-load to a plurality of storage controllers of a storage system, detecting a code-load failure, identifying the stage of the code-load failure and initiating a code-load recovery process based upon the identification of the stage that the code-load failure occurred.

In another embodiment of the present invention, a method for providing automatic recovery from premature reboot of a system during a concurrent upgrade is provided. The method includes beginning a concurrent code-load to a plurality of storage controllers of a storage system, detecting a code-load failure, identifying the stage of the code-load failure and initiating a code-load recovery process based upon the identification of the stage that the code-load failure occurred.

In another embodiment of the present invention, a system is provided. The system includes means for processing data and executing program instructions and means, coupled to the means for processing and executing, for storing at least one program of instructions to perform operations, the operations including beginning a concurrent code-load to a plurality of storage controllers of a storage system, detecting a code-load failure, identifying the stage of the code-load failure and initiating a code-load recovery process based upon the identification of the stage that the code-load failure occurred.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing automatic recovery from premature reboot of a system during a concurrent upgrade. The method, apparatus and program storage device for providing automatic recovery from premature reboot of a system during a concurrent upgrade is designed to allow the code upgrade to continue despite the premature reboot of the system. The upgrade may continue without causing any manual intervention to recover. Further, exposure to a single point of failure and performance degradation is significantly minimized and the support costs for concurrent code-load upgrades of storage systems is reduced by minimizing the risks of interruption of service.

Figure 1:
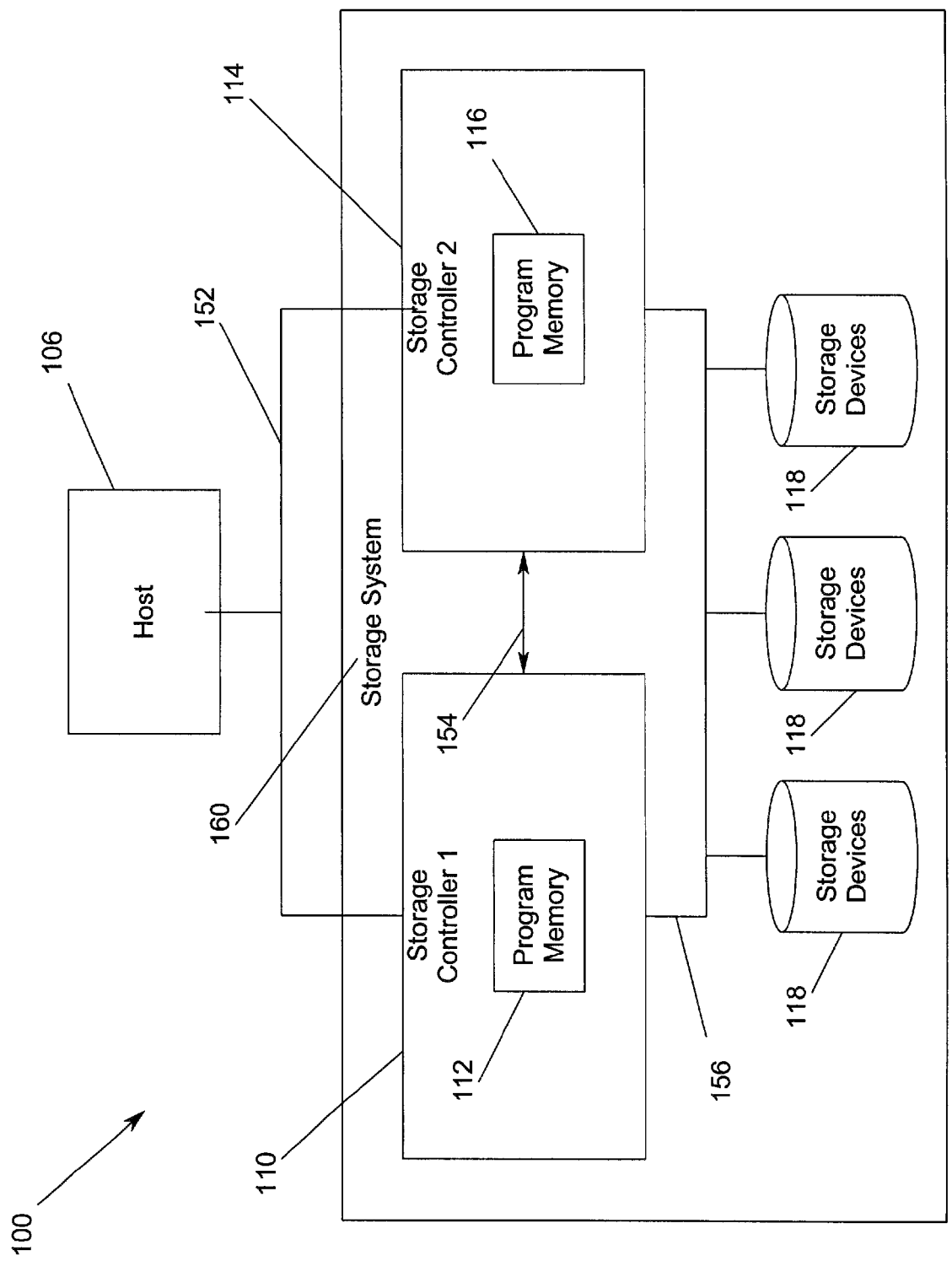
FIG. 1 illustrates a computer storage system according to an embodiment of the present invention.

FIG. 1 illustrates a computer storage system 100 according to an embodiment of the present invention. In FIG. 1, first and second storage controllers 110 and 114 cooperate in accordance with the present invention to control read and writes to storage system 160. A host system 106 is shown coupled to the first and second storage controllers 110 and 114 via path 152. Host system 106 may direct I/O requests via path 152 to either or both of first and second controllers 110 and 114. For example, host system 106 may detect an error in accessing a volume of storage system 160 via one controller (i.e., 110 or 114) and re-issue the I/O request to the alternate controller automatically. Such errors may include an explicit error status returned from the first controller or timeouts due to an unresponsive controller. First and second controllers 110 and 114 also include capabilities to transfer ownership of storage volumes in the system from one controller to another as required to complete an I/O request sent to the storage system 160 by host system 106. The re-issued I/O request are therefore processed by an appropriate one of the controllers that presently owns the identified storage volume of the request and is operable to process the I/O request.

Inter-controller communication path 154 maybe provided to allow communications between controllers 110 and 114 required to coordinate such transfer of ownership of storage volumes. Storage controllers 110 and 114 store and retrieve data on storage devices 118 via path 156. First and second controller 110 and 114 perform storage management on the storage devices 118. In particular, first and second controllers 110 and 114 perform RAID management to improve reliability of the storage system 160 and to improve overall performance of the system. It is common that the plurality of storage devices 118 are logically subdivided by operation of the controllers 110 and 114 into subsets. Such subsets may be referred to as volumes or storage volumes. In the case of RAID storage management, it is common to refer to the subsets as logical units or LUNs or redundancy groups. As used herein, the term volume or storage volume is intended to represent all such logical groupings that subdivide the disk drives. It should be noted that the subdivision may be as simple as defining a single storage volume that includes all disk drives of the system.

Controller 110 includes program memory 112 for storing firmware that, when executed, defines operation of controller 110. In like manner, controller 114 includes program memory 116 for storing its operational firmware. It is critical in such a multiple controller environment to ensure compatibility between revisions of firmware operating in the cooperating multiple controllers 110 and 114. Accordingly, reliable and robust synchronization and updating of the firmware resident and operating in storage controllers 110 and 114 is needed.

As shown in FIG. 1, second controller 114 may be any number of other controllers in storage system 160. A first controller 110 is often identified as a primary controller and is responsible for management functions. Any number of second controllers 114 may operate in conjunction with primary controller 110. Those skilled in the art will recognize that the first controller 110 may perform the methods defined herein in conjunction with any number of second controllers.

Those skilled in the art will recognize that the various communication paths 152 through 156 may be any of several well-known, standard communication media and protocols, e.g., a simple serial connection, a network connection, a SCSI connection, a parallel SCSI connection, a Fibre Channel connection, or any of several other standard communication media and protocols.

Figure 2:
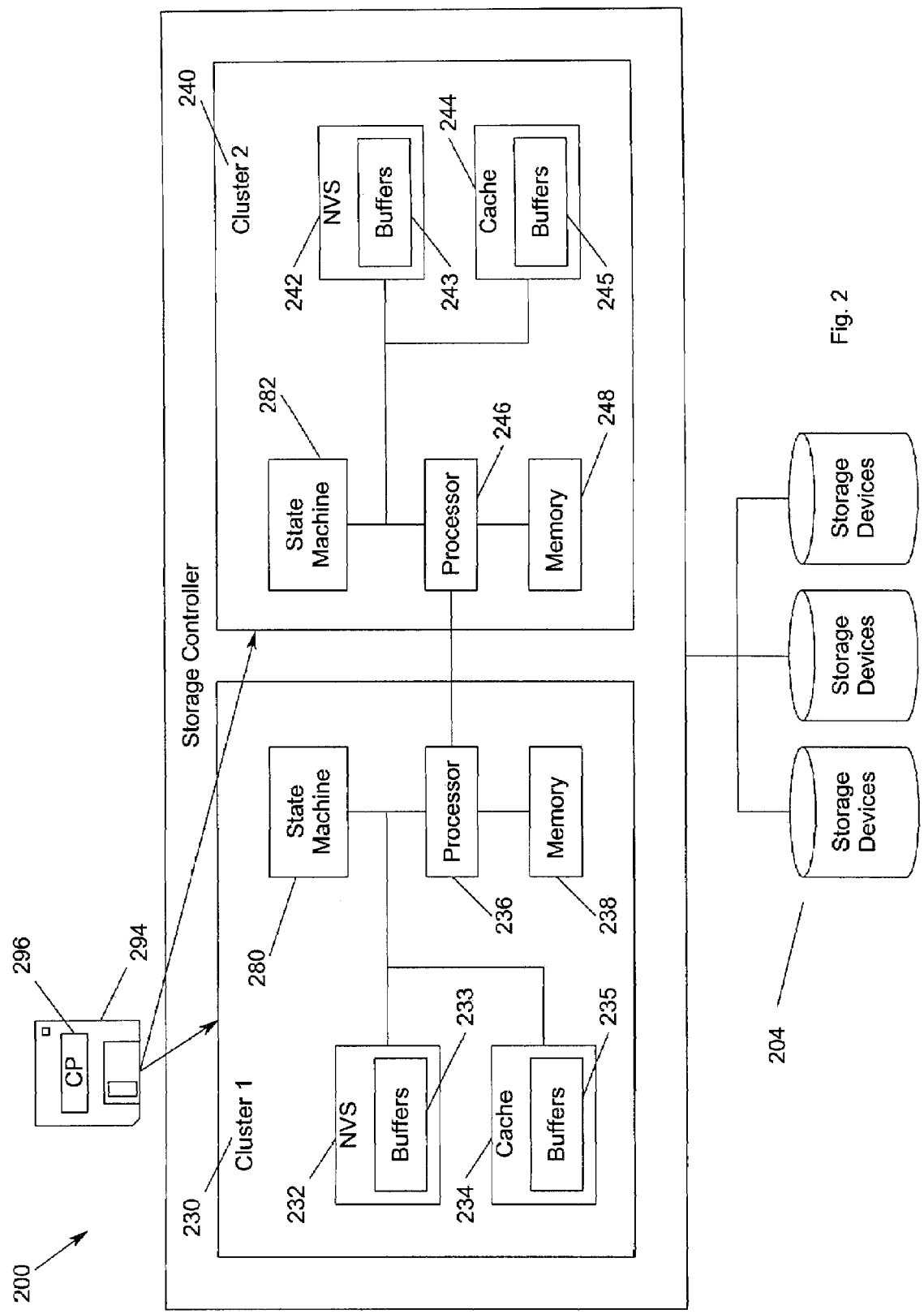
FIG. 2 is a block diagram of a storage controller according to an embodiment of the present invention.

FIG. 2 is a block diagram of a storage controller 200 according to an embodiment of the present invention. The storage controller 200 is configured in a dual cluster mode. However, those skilled in the art will recognize that the storage controller 200 of FIG. 2 is provided merely as an example and that the invention is not meant to be limited to a particular configuration. In FIG. 2, the storage controller 200 is coupled through appropriate adapters or interfaces to one or more host devices, also through appropriate adapters or interfaces to one or more physical storage devices 204, such as for example magnetic disk drives, optical disc drives or NVRAM storage devices.

The storage controller 200 may be configured to include one or more clusters, such as first and second cluster 230 and 240. Each cluster 230 and 240 may be configured to include a non-volatile storage memory (NVS) 232 and 242 and temporary storage, such as cache memory 234 and 244, as well as a processor 236 and 246 and operating memory 238 and 248. The processors 236 and 246 are able to communicate with each other and supervise all operations of the respective clusters 230 and 240 by executing instructions stored in the operating memory 238 and 248.

A portion of each NVS memory 232 and 242 is allocated to buffers 233 and 243, respectively. Similarly, a portion of each cache memory 234 and 244 is allocated to buffers 235 and 245, respectively. In the configuration illustrated in FIG. 2 of the NVS and cache of the two clusters, the NVS 232 and cache 234 of the first cluster 230 are of the same size as the NVS 242 and cache 244 of the second cluster 240. The amount of space allocated to buffers may be a predetermined proportion of the total memory, e.g., NVS or cache as the case may be. Thus, the amount of the NVS memory allocated to buffers is preferably the same as the amount of the cache memory allocated to buffers, with the balance dedicated to storing customer data. However, it will be appreciated that other configurations of NVS, cache and buffers in the clusters may be implemented.

Generally, the software, the storage controller 200 and the instructions derived therefrom, are all tangibly embodied in a computer-readable medium, e.g. one or more of the data storage devices 294. Moreover, instructions 296 when read and executed by the storage controller 200, causes the storage controller 200 to perform the steps necessary to implement and/or use the present invention. Under control of an operating system, the storage controller 200, and the instructions 296 may be loaded from the data storage device 294 into the storage controller, e.g., processors 236, 246, memories 238, 248, NVS 232, 242, etc., for use during actual operations.

The present invention may be embodied as a method, apparatus, or article of manufacture and may be implemented as software, firmware, hardware, or any combination thereof. The term "article of manufacture" (or alternatively, "computer program product") as used herein is intended to encompass a computer program accessible from any computer-readable device, carrier, or media. Those skilled in the art will recognize many modifications may be made to this configuration without departing from the scope of the present invention.

Figure 3:
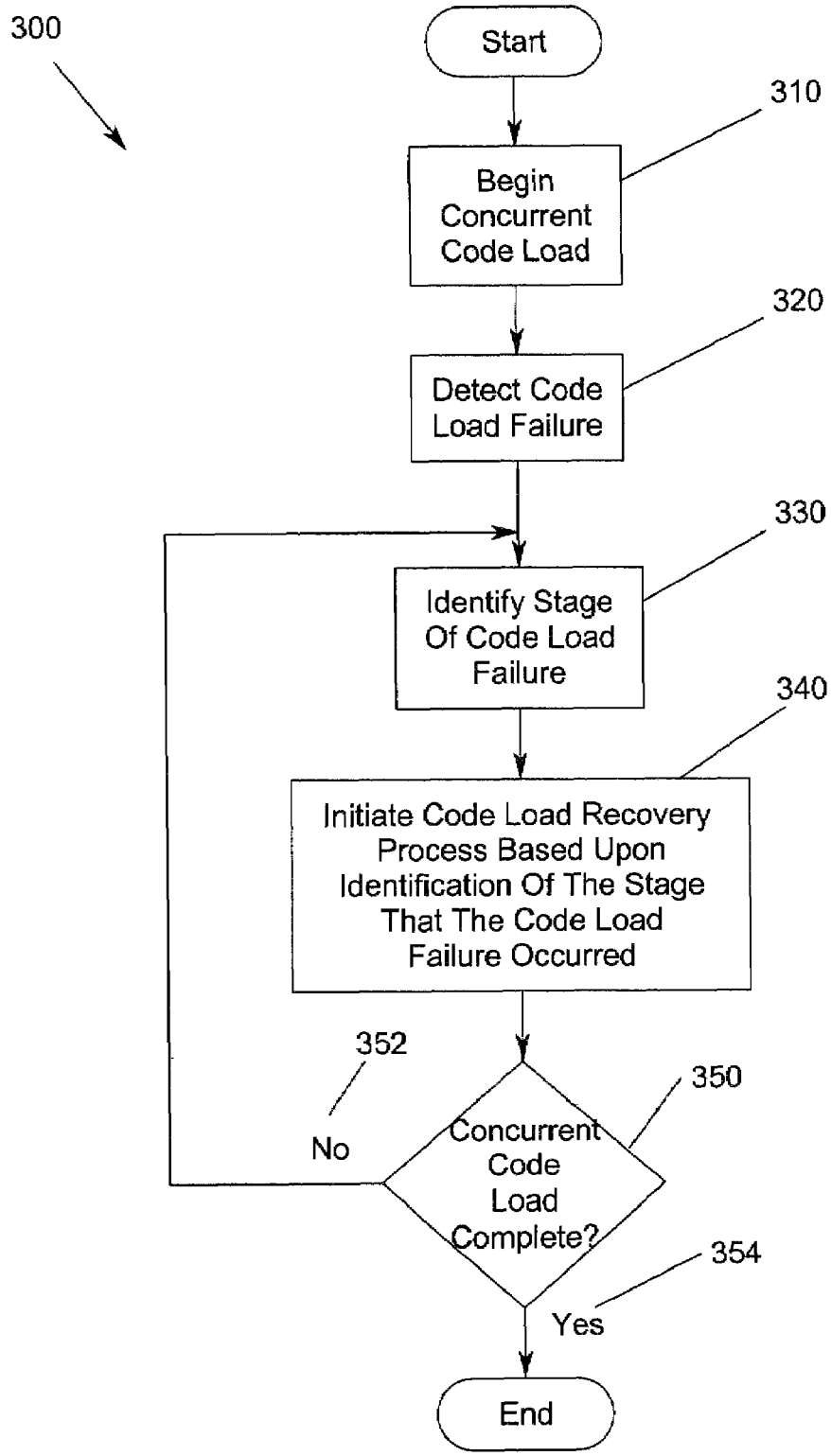
FIG. 3 is a flow chart of the method for providing automatic recovery from premature reboot of a system during a concurrent upgrade according to an embodiment of the present invention.

FIG. 3 is a flow chart 300 of the method for providing automatic recovery from premature reboot of a system during a concurrent upgrade according to an embodiment of the present invention. The code-load method 300 according to an embodiment of the present invention provides automatic recovery from a range of errors, which cause the machine to reboot unexpectedly during the upgrade. Such errors may include power failures and system crashes that may result for example from a bug in the system code bugs that cause a system to crash. The method 300 uses a strategy that attempts to move forward with the failed upgrade process transparently (i.e., without user interaction and without restarting the upgrade process) when the process has reached certain checkpoints. A description of such checkpoints is provided herein below with reference to FIGS. 4-5.

The ability to continue an otherwise failed code-load without restarting is based upon the idempotent characteristics of the code-load code itself. In other words, portions of the code-load that were previously loaded have no effect by re-initiating the failed code-load. The code-load process continues as if the upgrade process was never interrupted or ignores the failure because the failure does not affect the overall system availability. In contrast, if the code-load does not exhibit idempotent characteristics, then the upgrade-process could not resume at the point of failure. In such an instance, the upgrade process would thus need to be initiated from the beginning.

Referring to FIG. 3, a concurrent code-load is started 310. A code-load failure occurs in the code-load upgrade process and is detected 320. The stage that the code-load failure occurred is identified 330. The extent to which a code-load failure can be recovered from can depend on the particular stage at which the code-load upgrade process is interrupted. The upgrade-process may resume at the point of failure and continue the code-load upgrade process as if it was never interrupted or ignore the failure since it did not affect the overall system availability. The code-load recovery process, which is based upon the identification of the stage that the code-load failure occurred, is initiated 340. If the concurrent code-load completes 354, the process ends. If not 352, the process returns to identify the stage that the code-load failure occurred 330.

Figure 4:
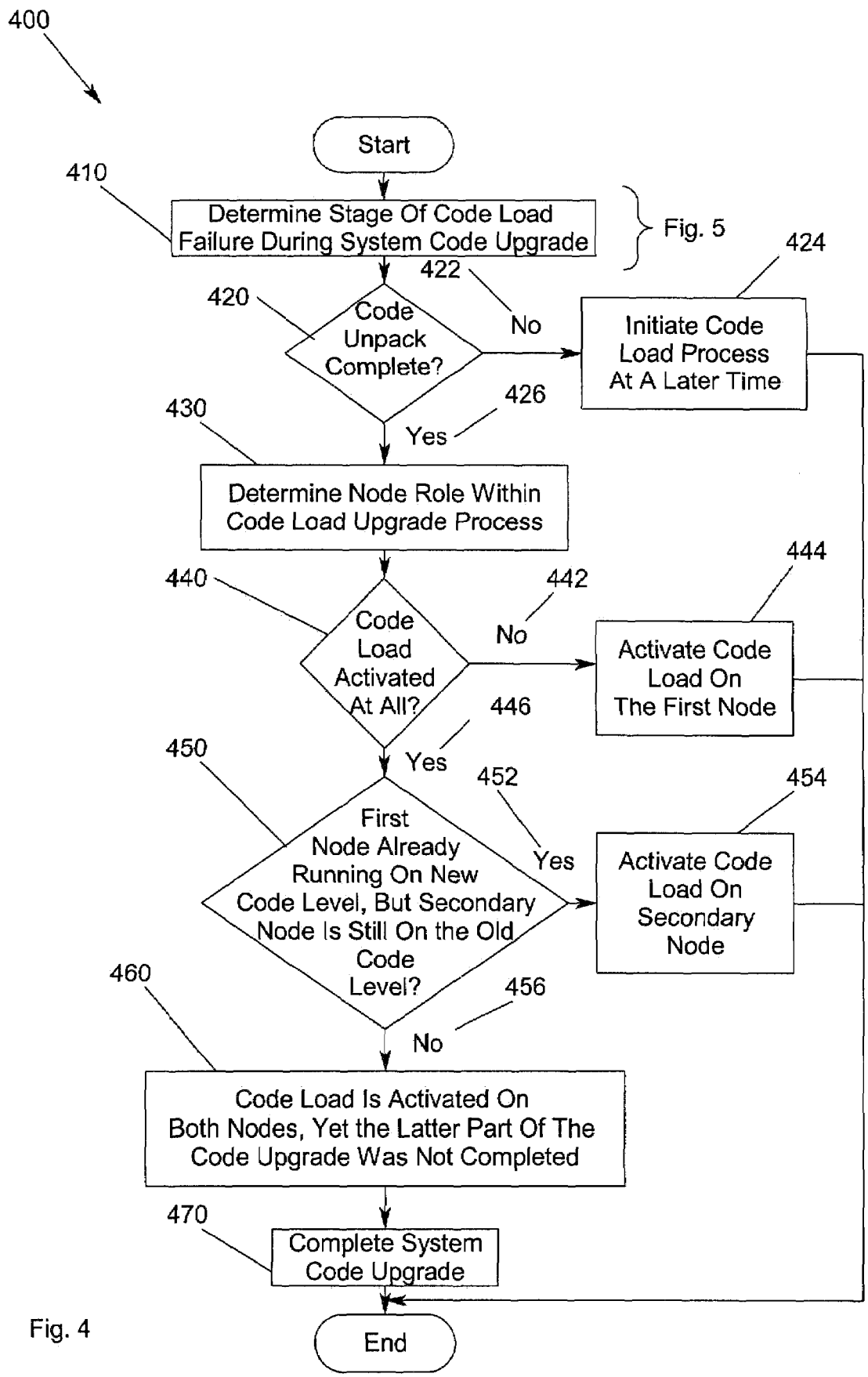
FIG. 4 is a flow chart showing the stages of the concurrent code-load according to an embodiment of the present invention.

FIG. 4 is a flow chart 400 showing the stages of the concurrent code-load according to an embodiment of the present invention. The process illustrated in FIG. 4 represents blocks 330 and 340 in FIG. 3. In FIG. 4, the stage that the code-load failure occurred is determined 410. Based upon this information, the method for providing automatic recovery from premature reboot of a system during a concurrent upgrade is performed. The concurrent code-load has two main stages. The first stage is the unpacking the new code, which is accomplished on an inactive partition and as such does not affect the current system operation. A determination is made whether the code unpack stage completed 420. During the unpacking-stage, the storage-device is fully operational (on the old-code level). A premature-reboot failure (such as power-failure or system crash etc.) during the unpacking-stage is "implicitly" and inherently automatically solved, as the system will resume its full-operational mode as if it was not in the middle of code-load. If the code unpack was not completed before a premature-reboot failure occurs, a new code-load process will have to be rescheduled later 424. No attempt is made to continue the code-load, as the system is not exposed in any way or fashion.

The second phase of code-load is when the new-code-level is gradually being introduced. This stage is a very delicate one wherein the system goes through number of single-node-operational stages as well as mixed-code-level-operational stages (where one node runs on the old code-level and its peer on the new-code-level). The method for providing automatic recovery from premature reboot of a system during a concurrent upgrade according to an embodiment of the present invention makes that latter code-load-phase more resilient to external failures so that the concurrent-code-load can indeed reach its full-operational state on the new-code-level despite of such failures.

Returning to FIG. 4, if the code unpacking is complete 426, there is no need to unpack the code from the start because the code on the other partition is complete. Accordingly, the process continues as if the code-load just reached that stage. The exact path taken is dependent on the node role within the upgrade process 430. A determination is then made whether the new-code-level was not activated at all 440. If the new code-level has not been activated at all 442, the new-code-level-is activated on the first-node 444.

When a code-load is activated, the code-load updates the nodes one at a time rather than simultaneously in order to preserve the dual node redundancy. Thus, it is possible that the code-load can fail during the process before the second node is updated or the latter part of the code-upgrade is not completed. Any failure during the latter part of the code-load-process leaves the system exposed to a single-point-of failure and/or in a degraded form. When the new code level is activated on both nodes, both nodes are preparing to obtain a new code upgrade. Consequently, this does not mean that both nodes are to be updated simultaneously.

If at least a portion of the new code-level has been activated 446, different scenarios are possible. A determination is made whether the first-node already runs on the new-code-level but the secondary node is still on the old-code-level 450. If the first-node already runs on the new-code-level but the secondary node is still on the old-code-level 452, the new-code-level is activated on the secondary-node 454. If the answer to whether the first-node already runs on the new-code-level but the secondary node is still on the old-code-level is negative 456, the new code-level is activated on both nodes, yet the latter part of the code-upgrade was not done 460.

To fulfill the redundancy for two nodes, both nodes should be running on the same code level in order for one node to take over if the other one goes down for a failure or for maintenance. Accordingly, the code-load process will determine the last successful step performed before the premature reboot and then based on that information, the code-load process will proceed to complete the whole system code-upgrade 470.

Figure 5:
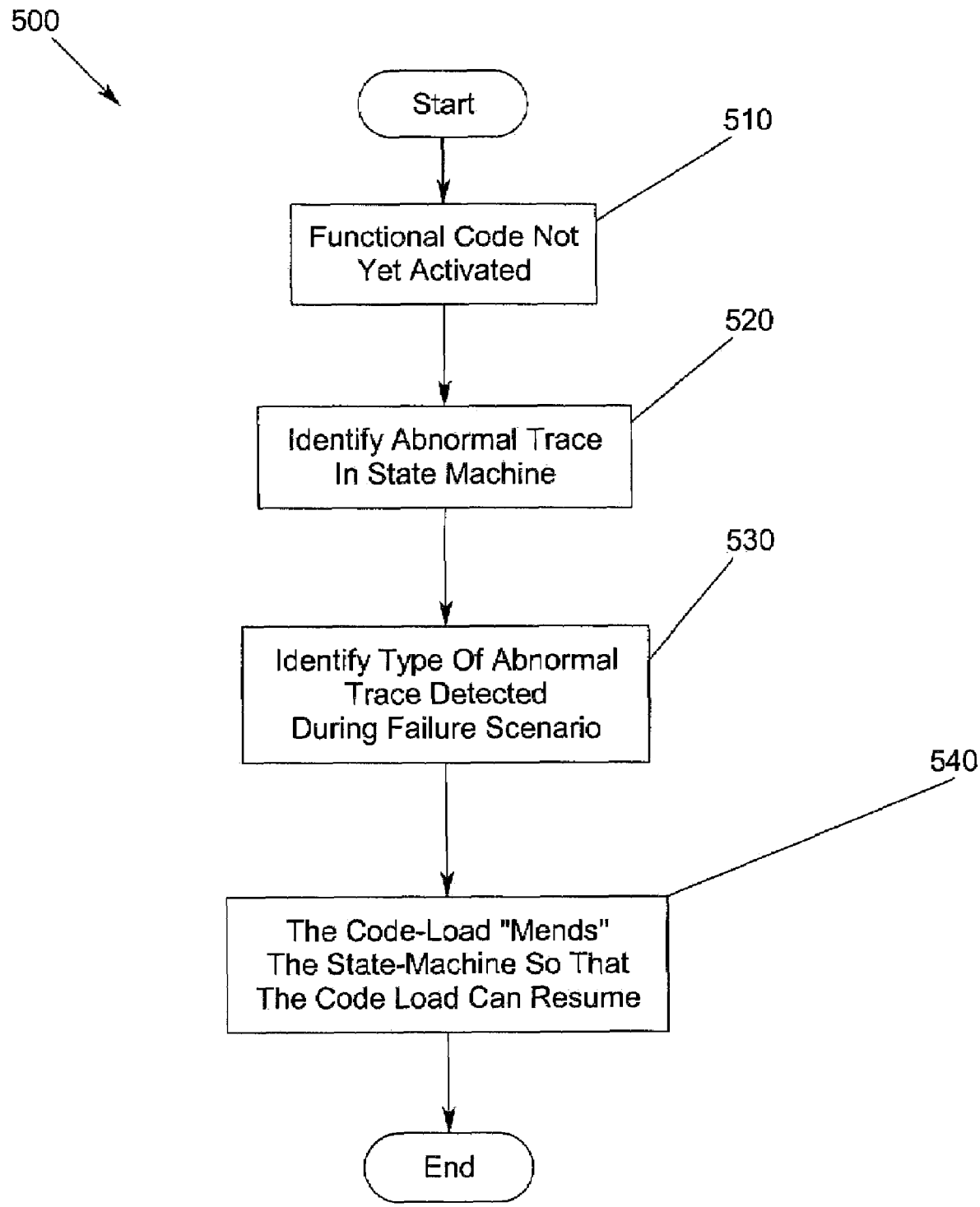
FIG. 5 is a flow chart showing the determination of the stages for the code-load failures according to an embodiment of the present invention.

FIG. 5 is a flow chart 500 illustrating a method of determining at which stage a code-load failure has occurred according to an embodiment of the present invention. The process illustrated in FIG. 5 represents block 410 in FIG. 4. FIG. 5 first illustrates the condition that the functional-code is not activated 510. This is evident because FIG. 4 shows that the code-load is not activated at 444, 454 and 460 in FIG. 4. The code-load process then identifies an abnormal trace 520. For example, a state machine may be provided to maintain the status of various conditions in the controller following programmed events. Trails of various transient events occurring in the system may also be maintained as traces. An abnormal trace could be detected by monitoring the states to identify when a trace branches to a state outside the flow of the normal upgrade process. One example of an abnormal trace is when the system reboots without being instructed to reboot. Once the code-load process identifies the abnormal trace, e.g., a premature reboot, the process scans the machine-states to identify the particular type of abnormal trace during the failure scenario 530, i.e., what stage of the upgrade process did the failure occur. After identifying the failure scenario, the code-load process returns the state-machine to a state that allows the code-load to resume at the stage at which the failure occurred 540. Accordingly, the code-load process may resume its normal code-load activity as if the premature reboot failure did not occur.

Accordingly, the method, apparatus and program storage device for providing automatic recovery from premature reboot of a system during a concurrent upgrade according to an embodiment of the present invention allows the code upgrade to continue despite the premature reboot of the system. The upgrade may continue without causing any manual intervention to recover. Further, exposure to a single point of failure and performance degradation is significantly minimized and the support costs for concurrent code-load upgrades of storage systems is reduced by minimizing the risks of interruption of service.

The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program product comprising a computer readable medium embodying at least one program of instructions executable by a computer to perform operations for providing automatic recovery from premature reboot of a system during a concurrent upgrade, comprising:

beginning a concurrent code-load to a plurality of storage controllers of a storage system;

detecting a code-load failure associated with a premature reboot of at least one of said storage controllers;

identifying a stage at which the code-load failure occurred; and initiating a code-load recovery process to resume the code-load based upon the identification of the stage that the code-load failure occurred.

2. The program product of claim 1 further comprising determining whether the concurrent code-load completed after initiating the code-load recovery process, returning to identify the stage of code-load failure if the code-load did not complete, else ending the concurrent code-load.

3. The program product of claim 1, wherein the identifying a stage at which the code-load failure occurred and initiating a code-load recovery process based upon the identification of the stage that the code-load failure occurred further comprises determining whether a code unpack completed and re-initiating the code-load at a later time if the code unpack did not complete.

4. The program product of claim 3 further comprising determining a node role within the code-load if the code unpack completes.

5. The program product of claim 4 further comprising determining whether the code-load activated at all and activating the code-load on a first node if the code-load is determined to have not activated at all.

6. The program product of claim 5 further comprising determining whether the first node is already running on the code-load, but the secondary node is still running on an old code level.

7. The program product of claim 6 further comprising activating the code-load on the secondary node if the first node is determined to be already running on the code-load, but the secondary node is still running on an old code level.

8. The program product of claim 7 further comprising determining that the code-load is activated on both nodes, yet the code-load is not complete if the secondary node is determined to be running on the code-load.

9. The program product of claim 8 further comprising completing a system code-load upgrade by completing the code-load.

10. The program product of claim 1, wherein the detecting a code-load failure further comprises identifying an abnormal trace in a state machine prior to activation of the code-load.

11. The program product of claim 10, wherein the identifying the stage of the code-load failure further comprises scanning machine states to identify a particular type of abnormal trace during the failure scenario.

12. The program product of claim 11 further comprising returning the state-machine to a state that allows the code-load to resume at a stage at which the failure occurred.

13. A system, comprising: a processor; and memory, coupled to the processor, the memory comprising a computer usable medium embodying at least one program of instructions to perform operations, the operations comprising:

beginning a concurrent code-load to a plurality of storage controllers of a storage system;

detecting a code-load failure associated with a premature reboot of at least one of said storage controllers;

identifying a stage at which the code-load failure occurred; and initiating a code-load recovery process to resume the code-load based upon the identification of the stage that the code-load failure occurred.

14. The system of claim 13 further comprising determining whether the concurrent code-load completed, returning to identify the stage of code-load failure if the code-load did not complete, else ending the concurrent code-load.

15. The system of claim 13, wherein the identifying the stage at which the code-load failure occurred and initiating a code-load recovery process based upon the identification of the stage that the code-load failure occurred further comprises determining whether a code unpack completed and re-initiating the code-load at a later time if the code unpack did not complete.

16. The system of claim 15 further comprising determining a node role within the code-load if the code unpack completes.

17. The system of claim 16 further comprising determining whether the code-load activated at all and activating the code-load on a first node if the code-load is determined to have not activated at all.

18. The system of claim 17 further comprising determining whether the first node is already running on the code-load, but the secondary node is still running on an old code level.

19. The system of claim 18 further comprising activating the code-load on the secondary node if the first node is determined to be already running on the code-load, but the secondary node is still running on an old code level.

20. The system of claim 19 further comprising determining that the code-load is activated on both nodes, yet the code-load is not complete if the secondary node is determined to be running on the code-load.

21. The system of claim 20 further comprising completing a system code-load upgrade by completing the code-load.

22. The system of claim 13, wherein the detecting a code-load failure further comprises identifying an abnormal trace in a state machine prior to activation of the code-load.

23. The system of claim 22, wherein the identifying the stage of the code-load failure further comprises scanning machine states to identify a particular type of abnormal trace during the failure scenario.

24. The system of claim 23 further comprising returning the state-machine to a state that allows the code-load to resume at a stage at which the failure occurred.

25. A method for providing automatic recovery from premature reboot of a system during a concurrent upgrade, comprising:

beginning a concurrent code-load to a plurality of storage controllers of a storage system;

detecting a code-load failure associated with a premature reboot of at least one of said storage controllers;

identifying a stage at which the code-load failure occurred; and initiating a code-load recovery process to resume the code-load based upon the identification of the stage that the code-load failure occurred.

26. The method of claim 25 further comprising determining whether the concurrent code-load completed, returning to identify the stage at which the code-load failure occurred if the code-load did not complete, else ending the concurrent code-load.

27. The method of claim 25, wherein the identifying the stage at which the code-load failure occurred and initiating a code-load recovery process based upon the identification of the stage that the code-load failure occurred further comprises determining whether a code unpack completed and re-initiating the code-load at a later time if the code unpack did not complete.

28. The method of claim 27 further comprising determining a node role within the code-load if the code unpack completes.

29. The method of claim 28 further comprising determining whether the code-load activated at all and activating the code-load on a first node if the code-load is determined to have not activated at all.

30. The method of claim 29 further comprising determining whether the first node is already running on the code-load, but the secondary node is still running on an old code level and activating the code-load on the secondary node if the first node is determined to be already running on the code-load, but the secondary node is still running on an old code level.

31. The method of claim 30 further comprising determining that the code-load is activated on both nodes, yet the code-load is not complete if the secondary node is determined to be running on the code-load, a system code-load upgrade being completed by concluding the code-load.

32. The method of claim 25, wherein the detecting a code-load failure further comprises identifying an abnormal trace in a state machine prior to activation of the code-load.

33. The method of claim 32, wherein the identifying the stage of the code-load failure further comprises scanning machine states to identify a particular type of abnormal trace during the failure scenario, said method further comprising returning the state-machine to a state that allows the code-load to resume at a stage at which the failure occurred.

34. The method of claim 25 wherein:

said concurrent code-load includes a plurality of expected operations including an expected reboot operation;

said detecting includes automatically detecting without manual intervention a code-load failure associated with a premature reboot of at least one of said storage controllers wherein said premature reboot is an unexpected operation which occurs prematurely before said expected reboot operation and wherein the detecting a code-load failure further comprises identifying an abnormal trace in a state machine prior to activation of the code-load, said abnormal trace including a premature reboot;

said identifying includes automatically identifying without manual intervention a stage at which the code-load failure occurred, said identifying including determining whether a code unpack completed wherein the identifying the stage of the code-load failure further comprises scanning machine states to identify a particular type of abnormal trace during the failure scenario;

said initiating includes automatically initiating without manual intervention a code-load recovery process to automatically resume the code-load without manual intervention based upon the identification of the stage that the code-load failure occurred, said recovery process initiating including returning a state-machine to a state that allows the code-load to automatically resume without manual intervention at a stage at which the failure occurred as if the premature reboot did not occur, and re-initiating the code-load at a later time if the code unpack did not complete;

said method further comprising:

automatically determining without manual intervention a node role within the code-load if the code unpack completes;

automatically determining without manual intervention whether the code-load activated at all and activating the code-load on a first node if the code-load is determined to have not activated at all; and automatically determining without manual intervention whether the first node is already running on the code-load, but the secondary node is still running on an old code level and activating the code-load on the secondary node if the first node is determined to be already running on the code-load, but a secondary node is still running on an old code level.

* * * * *